United States Patent [19]

Osada

[11] Patent Number: 4,705,245

[45] Date of Patent: Nov. 10, 1987

[54] DEVICE FOR BINDING WIRES OR THE LIKE

[75] Inventor: Hiroshi Osada, Yokohama, Japan

[73] Assignee: 'Nifco Inc., Yokohama, Japan

[21] Appl. No.: 886,611

[22] Filed: Jul. 18, 1986

[30] Foreign Application Priority Data

Jul. 27, 1985 [JP] Japan .................. 60-115233[U]

[51] Int. Cl.[4] .......................................... F16L 3/03
[52] U.S. Cl. .......................... 248/74.3; 24/16 PB; 248/71; 248/68.1
[58] Field of Search ............ 248/74.3, 71, 68.1, 248/73; 24/16 PB, 16 R

[56] References Cited

U.S. PATENT DOCUMENTS

| | | | |
|---|---|---|---|
| 2,937,834 | 5/1960 | Orenick et al. | 248/71 |
| 3,149,808 | 9/1964 | Weckesser | 24/16 PB X |
| 3,552,696 | 1/1971 | Orenick et al. | 248/71 X |
| 3,758,060 | 9/1973 | Schuplin | 248/74.3 |
| 4,128,220 | 12/1978 | McNeel | 248/74.3 X |
| 4,183,119 | 1/1980 | Stewart et al. | 24/16 PB |
| 4,236,280 | 12/1980 | Kreiseder | 24/16 PB |
| 4,272,047 | 6/1981 | Botka | 248/74.3 |
| 4,455,715 | 6/1984 | Matsui | 24/16 PB |
| 4,473,524 | 9/1984 | Paradis | 24/16 PB X |
| 4,561,153 | 12/1985 | Matsui | 24/16 PB |

FOREIGN PATENT DOCUMENTS 3315073 11/1983 Fed. Rep. of Germany ... 24/16 PB

Primary Examiner—Ramon O. Ramirez
Attorney, Agent, or Firm—Oblon, Fisher, Spivak, McClelland, & Maier

[57] ABSTRACT

A binding device comprises a band and a buckle. The band has a plurality of lock grooves formed on one surface and a coupling hole formed adjacent to one end. The buckle has an insertion hole for inserting the band therethrough. The walls defining the insertion hole are provided with a ratchet pawl for engagement in the lock grooves of the band. The buckle also has a lock member for insertion into a coupling hole of the band. Wires are bound together by inserting the band into the insertion hole of the buckle, then looping the band round the wires and then forcibly inserting the lock member into the coupling hole.

7 Claims, 7 Drawing Figures

DEVICE FOR BINDING WIRES OR THE LIKE

FIELD OF THE INVENTION

This invention relates to a device made of a plastic material for binding wires or the like.

BACKGROUND OF THE INVENTION

FIG. 1 shows a prior art molded, one-piece plastic device for securing wires or the like in a bound form to a predetermined place. Such devices as this are disclosed, for example, in U.S. Pat. Nos. 4,236,280 and 4,455,715. As is shown in FIG. 1, the device comprises a band 1 with a buckle 2 provided at one end. A lock member 3, having an anchor-like shape for instance, which is to be forcibly inserted, is provided on the outer surface of the buckle 2. The band 1 has a plurality of transversal lock grooves 4 provided on one surface. The buckle 2 has an insertion hole 5 into which the band 1 is inserted. The top wall of the insertion hole 5 is provided with a ratchet pawl 6 which is elastically engaged in the lock grooves 4 to retain the band 1 against returning.

To secure wires W in a bound form with the prior art binding device having the above structure, the band 1 is looped round the wires W, then an end 1a of the band 1 is inserted through the insertion hole 5 of the buckle 2, then the band 1 is pulled to bind the wires W, and thereafter the lock member 3 is forcibly inserted into a predetermined mounting hole, e.g., a mounting hole 7a formed in a plate 7.

To ensure reliable coupling between the band 1 and a pawl projection 6a of the ratchet pawl 6, the insertion hole 5 of the buckle 2 has a size slightly greater than the band 1.

Therefore, the operation of looping the band 1 round the wires W and then inserting the end 1a of the band 1 through the small insertion hole 5 of the buckle 2, is very cumbersome. This is also because of the fact that it is difficult to see the insertion hole of the buckle.

Further, the length of the band 1 is set in conformity to the number of wires W to be bound, the diameter of the wires and other factors so that there will be no wasted portion of the band. Therefore, when the band 1 is looped round the wires W, the end of the band cannot be moved so freely that the cumbersomeness of inserting the end of the band into the small insertion hole 5 is increased. Therefore, when this device is used for binding and securing wires in a narrow space in an automobile or an electric apparatus, a great deal of labor is required, and the operability when the device is used in a line operation is extremely inferior.

Further, to remove the band 1 from the wires W, it is necessary to disengage the ratchet pawl 6 from the lock groove 4 by raising the end of the ratchet pawl 6 and pulling out the band 1 through the insertion hole 5 of the buckle 2 while holding the ratchet pawl 6 in the raised state. This operation is again cumbersome. Further, it is necessary to prepare a plurality of binding devices having bands 1 of different lengths in accordance with the number and size of the wires or the like to be bound.

OBJECT OF THE INVENTION

An object of the invention is to provide a binding device, which can extremely simplify the operation of securing wires or the like in a bound state.

SUMMARY OF THE INVENTION

According to the invention, there is provided a binding device which comprises a band and a buckle, the band having a plurality of lock grooves formed on one surface and having a coupling hole formed adjacent to one end, the buckle having an insertion hole for inserting the band therethrough, the walls defining the insertion hole being provided with a ratchet pawl to be engaged in the lock grooves formed in the band.

To bind wires with the binding device according to the invention, first the band is coupled to the buckle by inserting the end of the band into the insertion hole of the buckle. In this state, the band is looped round the wires, the lock member of the buckle is inserted into the coupling hole of the band, and the end of the band is pulled to contract the loop of the band and thus firmly bind the wires. If necessary, the lock member is inserted into a mounting hole formed in a predetermined position, thus completing the binding of the wires.

According to the invention, the band is inserted into the small insertion hole of the buckle before binding together the wires. Thus, a wire binding operation can be readily carried out even in a narrow place.

The above and other objects and features of the invention will become more apparent from the following detailed description with reference to the accompanying drawings.

DETAILED DESCRIPTION OF THE PREFERRED EMBODIMENT

Figure 1:
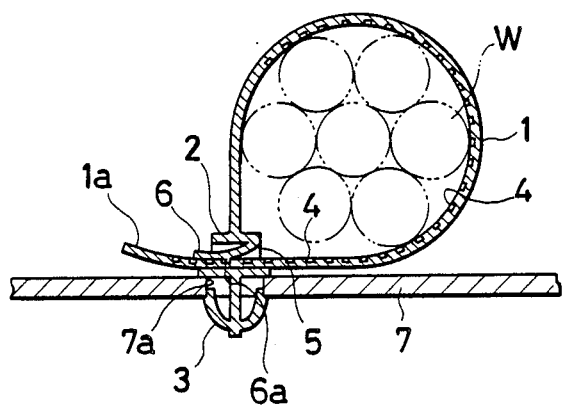
FIG. 1 is a sectional view illustrating an operation of securing wires in a bound state using a prior art binding device.
Figure 2:
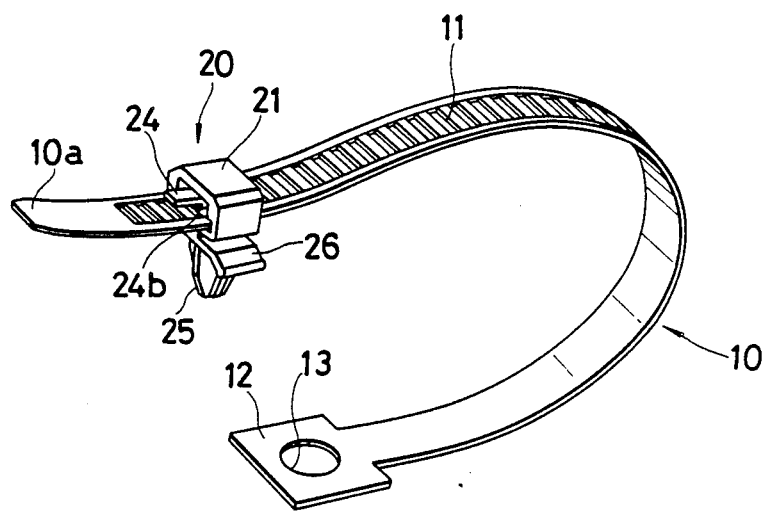
FIG. 2 is a perspective view showing an embodiment of the binding device according to the invention.

FIG. 2 shows an embodiment of the binding device according to the invention. The illustrated binding device is a plastic one-piece molding having a band 10 and a buckle 20.

The band 10 has a plurality of parallel lock grooves 11 formed on one side surface, and it has a platelike coupler 12 provided at one end. The coupler 12 has a central coupling hole 13 for coupling with the buckle 20.

Figure 3:
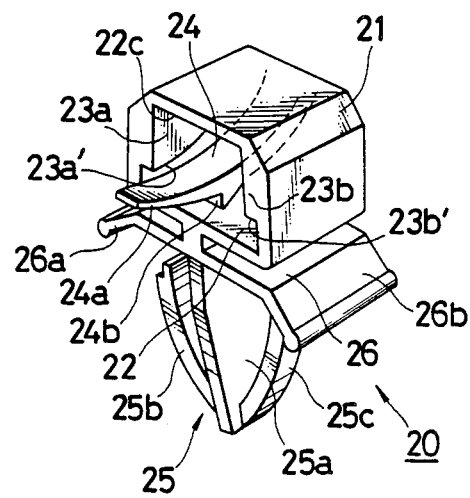
FIG. 3 is an enlarged perspective view showing the buckle of the binding device shown in FIG. 2.

The buckle 20 has a buckle body 21 to which the band 10 is locked after being inserted through it. The buckle body 21, as shown in FIG. 3, has an insertion hole 22 which has a width slightly greater than the width of the band 10 so that the band 10 can be inserted through it. The opposite side walls of the insertion hole 22 are provided with raised portions 23a and 23b. The raised portions 23a and 23b have a lower end which is gradually lowered from the inlet toward the outlet of the insertion hole 22 (i.e., from the right to the left in FIG. 3). As the band 10 is inserted through the buckle body 21, the band 10 proceeds from the inlet toward the outlet of the insertion hole 22 with its opposite edges in frictional contact with the lower end surfaces 23a' and 23b' of the raised portions 23a and 23b.

The top wall 22c of the insertion hole 22 is provided with a ratchet pawl 24. The ratchet pawl 24 extends from the inlet side of the insertion hole 22 and is inclined with substantially the same inclination as the lower end surfaces 23a' and 23b' of the raised portions 23a and 23b. It has an end portion 24a outwardly projecting from the outlet of the insertion hole 22. It is provided with a pawl projection 24b provided on the lower surface (in FIG. 3) at a position corresponding to the neighborhood of the outlet of the insertion hole 22. The free end of the ratchet pawl 24 is urged downwardly, if necessary.

The buckle 20 has a lock member 25 depending from the lower surface of the buckle body 21 (in FIG. 3). The lock member 25 is for being forcibly inserted into the coupling hole 13 of the coupler 12 of the band 10. In the illustrated embodiment, the lock member 25 is an anchor-type member, having a perpendicular plate-like portion 25a depending from the lower surface of the buckle body 21 and a pair of lock pawl portions 25b and 25c extending obliquely upwardly from the opposite sides of the lower end of the plate-like portion 25a.

A stem portion of the perpendicular plate-like portion 25a of the lock member 25 is provided with a pair of horizontal wing portions 26 extending in opposite directions between the buckle body 21 and the lock pawl projections 25b and 25c. The wing portions 26 have end portions 26a and 26b extending beyond the free ends 25b' and 25c' of the lock pawl projections 25b and 25c. The end portions 26a and 26b are inclined downwardly.

With the above construction of the binding device, by inserting the end 10a of the band 10 into the insertion hole 22 of the buckle 20 from the side of the stem of the ratchet pawl 24, the opposite edges of the band 10 proceed in contact with the lower end surfaces 23a' and 23b' of the raised portions 23a and 23b of the side walls of the insertion hole 22. The central portion of the band 10 proceeds while raising the ratchet pawl 24 in contact with the pawl projection 24b. The pawl projection 24b is eventually engaged in a lock groove 11 as shown in FIG. 2. In this state, the band 10 is retained against returning.

Figure 4:
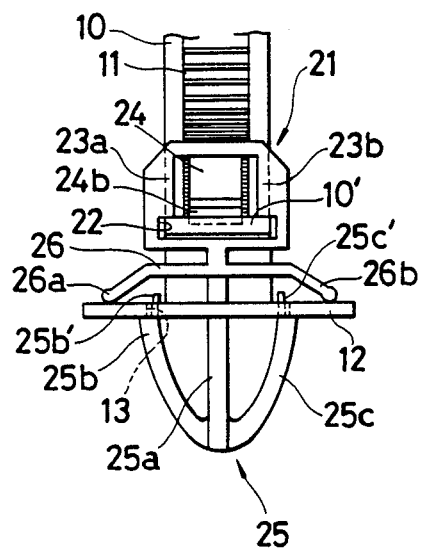
FIG. 4 is a view showing the binding device shown in FIG. 2 with the lock member of the buckle inserted in a coupling hole of the band.

In this state, by forcibly inserting the lock member 25 of the buckle 20 into the coupling hole 13 of the coupler 12 of the band 10, the lock pawl projections 25b and 25c are restored and engaged with the edge of the hole 13 of the coupler as shown in FIG. 4. Also, the end portions 26a and 26b of the wing portions 26 are in light contact with the coupler 12.

Figure 5:
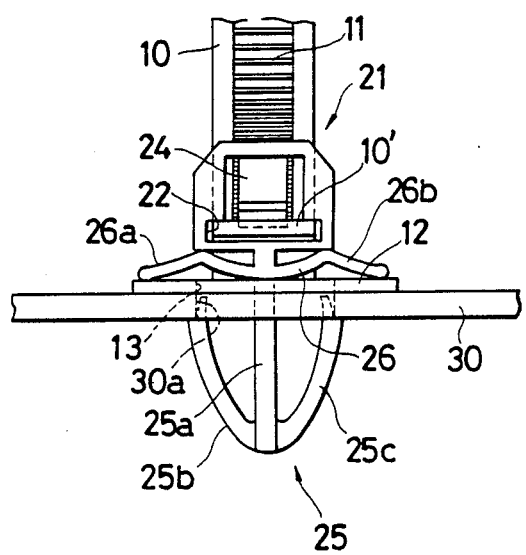
FIG. 5 is a view showing the binding device of FIG. 4 in a state inserted in a mounting hole of a panel.

By inserting the lock member 25 into a mounting hole 30a of a panel 30 in this state, the lock pawl portions 25b and 25c are engaged with the edge of the mounting hole 30a. At this time, the end portions 26a and 26b of the wing portions 26 are elastically deformed in contact with the coupler 12, as shown in FIG. 5. By this elastic restoring force, the binding device is firmly secured together with its coupler 12 to the panel 30.

Now, an operation of opening the binding device and securing the wires to a predetermined place by binding them will be described.

Figure 6:
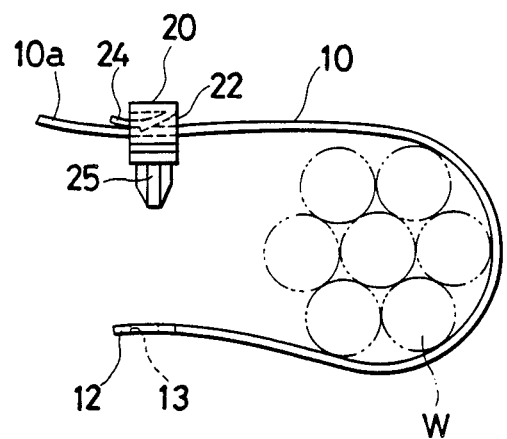
FIG. 6 is a view showing the binding device according to the invention with the band looped round wires.
Figure 7:
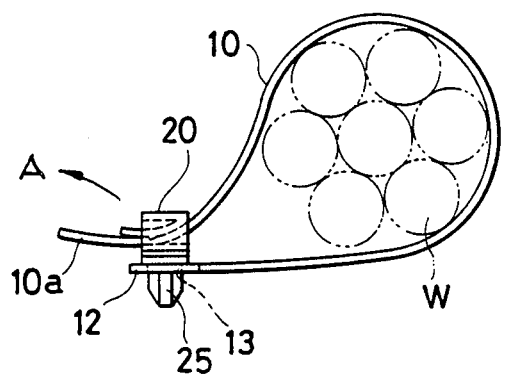
FIG. 7 is a view showing the binding device with the band looped round the wires and the lock member of the buckle inserted in the coupling hole of the band.

First, as shown in FIG. 6, the band 10 is coupled to the buckle 20 by inserting its end 10a through the insertion hole 22 of the buckle 20. Then, as shown in FIG. 7, the lock member 25 of the buckle 20 is forcibly inserted into the coupling hole 13 of the coupler 12 of the band 10, and the end 10a of the band 10 is pulled in the direction of arrow of the arrow A, thus contracting the loop formed by the band and firmly binding the wires W. Thereafter, the lock member 25 is forcibly inserted into the mounting hole 30a of the panel 30.

It is to be appreciated that the band 10 may be inserted in advance in the small insertion hole 22 of the buckle 20 for securing the wires or the like in the bound state. Thus, when conducting a securing operation in a narrow space in an automobile or an electric apparatus, the cumbersome operation of inserting the end 10a of the band into the insertion hole 22 is unnecessary, so that it is possible to extremely facilitate the operation.

Further, the device is firmly secured to the mounting hole 30a of the panel 30 by the elastic restoring forces of the wing portions 26 and lock pawl projections 25b and 25c. Thus, the stability of the securement can be increased. Further, the band 10 in the state binding the wires W may be released by merely releasing the engagement between the pawl projection 24b and lock groove 11 of the band 10 by raising the end portion 24a of the ratchet pawl 24 or by removing the lock member 25 from the panel 30 and the coupler 12.

The construction of the embodiment of the binding device described above is by no means limitative, and various changes and modifications are possible in various parts of the construction. For example, the lock member 25, which has been shown to have an anchor-like shape, may be replaced with a spearhead. Further, it is possible to omit the coupler 12 of the band 10 and merely provide a hole in an end portion of the band 10.

As has been described in the foregoing, with the binding device according to the invention it is possible to greatly facilitate the wire binding operation and greatly improve the operational efficiency compared with the prior art device. Further, where the number and size of the wires or the like to be bound vary, a fixed size of buckle can be used for various lengths of bands, which is economical.

What is claimed is:

1. A device for binding wires or the like, said device comprising a band and a buckle;
   said band having at least two side surfaces and two ends;
   said band having a plurality of lock grooves formed on one of said at least two side surfaces thereof and a coupling hole formed adjacent to one of said two ends thereof;
   said buckle comprising a buckle body having an outer surfce and an insertion hole defined by at least two inside walls for inserting said band therethrough, said insertion hole having an inlet for said band and an outlet for said band, an elastic ratchet pawl extending obliquely from one of said at least two inside walls of said buckle body defining said insertion hole toward the outlet of said insertion hole for said band, and lock means extending from the outer surface of said buckle body, inserted into said coupling hole of said band and engaged with edges of said coupling hole;
   the other one of said two ends of said band being inserted through said insertion hole of said buckle body from the inlet of said insertion hole for said band to permit said elastic ratchet pawl to rub said lock grooves and retain said band within said insertion hole of said buckle body so as to be slidable only in the direction from the inlet to the outlet of said insertion hole.

2. The binding device according to claim 1, wherein said elastic ratchet pawl has an end portion projecting outwardly from the outlet of said insertion hole.

3. A device for binding wires or the like, said device comprising:
  (a) a band:
    (i) having a first end and a second end;
    (ii) being at least approximately rectangular in in cross-section;
    (iii) having a first long side, a second long side, a first short side, and a second short side;
    (iv) having a plurality of lock grooves formed on the first long side thereof; and
    (v) having a coupling hole formed adjacent to the first end thereof, and
  (b) a buckle comprising:
    (i) a buckle body having:
      (A) an insertion hole for inserting the second end of said band therethrough, said insertion hole having a first opening through which, in use, the second end of said band is inserted and a second opening through which, in use, the second end of said band projects, said insertion holle having a first surface which, in use, faces the first long side of said band, a second surface which, in use, faces the second long side of said band, a third surface which, in use, faces the first short side of said band, and a fourth surface which, in use, faces the second short side of said band, and
      (B) an elastic ratchet pawl projecting from the first surface of said insertion hole adjacent the first opening of said insertion hole obliquely toward the second surface of said insertion hole and projecting out through the second opening of said insertion hole, and
    (ii) a lock member projecting from said buckle body at least approximately perpendicularly to said insertion hole, said lock member comprising at least two lock pawl portions sized and shaped to pass through said coupling hole in said band, to be cammed inwardly by said coupling hole in said band, and to engage side surfaces of said coupling hole in said band and to be resiliently inwardly deformed thereby prior to insertion of said locking member in an mounting hole.

4. A device as recited in claim 3 wherein said lock member further comprises at least two wing portions sized, shaped, and positioned to bear resiliently against the second surface of said band when said at least two lock pawl portions of said lock member are passed through said coupling hole in said band.

5. A device as recited in claim 3 wherein:

(a) each one of said at least two lock pawl portions has a notch composed of a first surface and a second surface;
(b) the first surface of each one of said notches is sized, shaped, and positioned so that, when said at least two lock pawl portions of said lock member are passed through said coupling hole in said band, the first surface makes surface contact with the second long side of said belt; and
(c) the second surface of each one of said notches is sized, shaped, and positioned so that, when said at least two lock pawl portions of said lock member are passed through said coupling hole in said band, the second surface makes surface contact with a side surface of said coupling hole in said band.

6. A device as recited in claim 3 wherein:
(a) the third surface of said insertion hole has a raised portion projecting toward the fourth surface of said insertion hole and extending from the first opening to the second opening of said insertion hole;
(b) the fourth surface of said insertion hole has a raised portion projecting toward the third surface of said insertion hole and extending from the first opening to the second opening of said insertion hole;
(c) the raised portion on the third surface of said insertion hole begins at the first surface of said insertion hole and extends toward but does not reach the second surface of said insertion hole;
(d) the raised portion on the fourth surface of said insertion hole begins at the first surface of said insertion hole and extends toward but does not rech the second surface of said insertion holes;
(e) the raised portion on the third surface of said insertion hole has an end surface facing the second surface of said insertion hole;
(f) the raised portion on the fourth surface of said insertion hole has an end surface facing the second surface of said insertion hole;
(g) the end surface on the raised portion on the third surface of said insertion hole slants obliquely and is closre to the first surface of said insertion hole at the first opening of said insertion hole than it is at the second opening of said insertion hole; and
(h) the end surface on the raised portion on the fourth surface of said insertion hole slants obliquely and is closer to the first surface of said insertion hole at the first opening of said insertion hole than it is at the second opening of said insertion hole.

7. A device as recited in claim 3 and further comprising a pawl projection projecting from said elastic ratchet pawl, said pawl projection being sized, shaped, and positioned to engage one of said plurality of lock grooves formed in the first long side of said band when the second end of said band is passed through said insertion hole.

* * * * *